Figure 1:
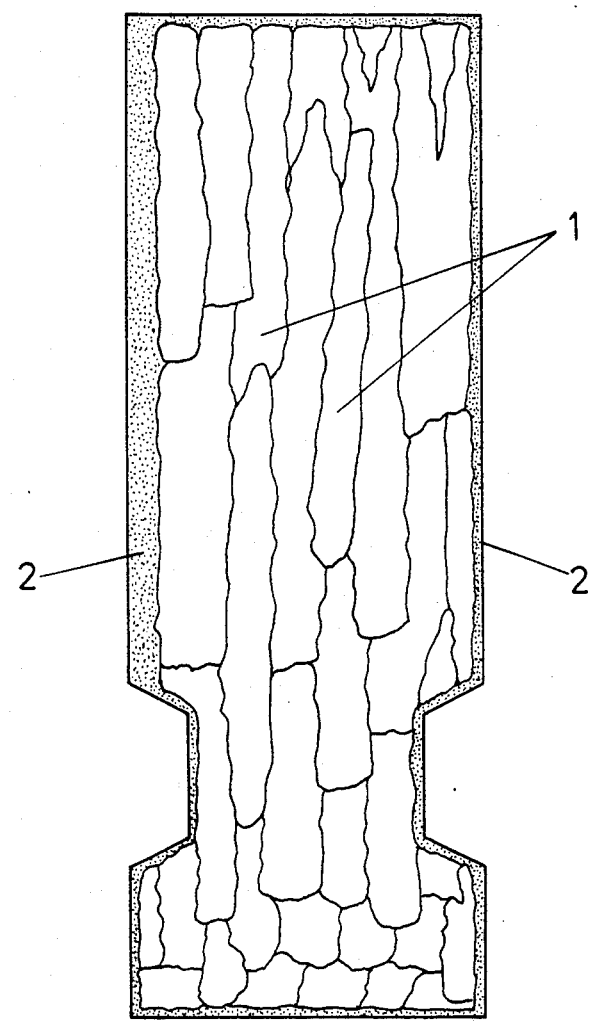

United States Patent [19]

Singer

[11] Patent Number: 4,531,981
[45] Date of Patent: Jul. 30, 1985

[54] COMPONENT POSSESSING HIGH RESISTANCE TO CORROSION AND OXIDATION, COMPOSED OF A DISPERSION-HARDENED SUPERALLOY, AND PROCESS FOR ITS MANUFACTURE

[75] Inventor: Robert Singer, Baden, Switzerland

[73] Assignee: BBC Brown, Boveri & Company, Limited, Baden, Switzerland

[21] Appl. No.: 575,950

[22] Filed: Feb. 1, 1984

[30] Foreign Application Priority Data

Feb. 1, 1983 [EP] European Pat. Off. ........ 83200173.9

[51] Int. Cl.³ ............................................. C22F 1/10
[52] U.S. Cl. .......................... 148/11.5 N; 148/11.5 P; 148/405; 148/426; 148/427; 148/428
[58] Field of Search ..................... 148/11.5 N, 11.5 P, 148/11.5 R, 405, 426, 427, 428

[56] References Cited

U.S. PATENT DOCUMENTS

| | | | |
|---|---|---|---|
| 3,260,505 | 7/1966 | Ver Snyder | 148/11.5 P |
| 4,345,950 | 8/1982 | O'Hara | 148/11.5 N |
| 4,401,480 | 8/1983 | Crombie, III | 148/11.5 N |

Primary Examiner—Wayland Stallard
Attorney, Agent, or Firm—Oblon, Fisher, Spivak, McClelland & Maier

[57] ABSTRACT

A component possessing high resistance to corrosion and oxidation, composed of a dispersion-hardened superalloy having a high creep strength, comprises a coarse-grained core (1) which has high strength at high temperatures, and a fine-grained skin zone (2) which forms a case. The component is manufactured with the aid of a heat-treatment, or thermomechanical treatment, in a manner such that, starting from a fine-grained initial condition, the skin zone (2) is restrained from participating in the recrystallization which leads to the formation of coarse grains in the core (1).

15 Claims, 2 Drawing Figures

COMPONENT POSSESSING HIGH RESISTANCE TO CORROSION AND OXIDATION, COMPOSED OF A DISPERSION-HARDENED SUPERALLOY, AND PROCESS FOR ITS MANUFACTURE This invention relates to a component, having high resistance to corrosion and oxidation, composed of a dispersion-hardened superalloy and the process for the manufacture of such a component.

Superalloys containing oxide-dispersion hardening systems are stronger at high temperatures than corresponding materials without these dispersoids. Components manufactured from these dispersion-hardened superalloys consequently exhibit longer lives, or can be employed at higher operating temperatures. This, however, generally necessitates that the resistance to high-temperature corrosion, and in particular to oxidation, be improved as well. In the interest of achieving the highest possible creep strength at high temperatures, superalloys are preferably employed in a coarse-grained microstructural condition (optimally with columnar crystals which are oriented in the direction corresponding to the principal stress).

It is known, on the other hand, that reducing the grain size can enhance the resistance to oxidation and corrosion, and, it is suspected, the adherence of certain protective coatings (C. S. Giggins, F. S. Pettit, "The effect of alloy grain size and surface deformation on the selective oxidation of chromium in nickel-chromium alloys at temperatures of 900° and 1100° C.", Trans. TMS-AIME, 245, page 2509, 1969; P. Huber, G. H. Gessinger, "Materials and coatings to resist high temperature oxidation and corrosion", Conf. Proc., Düsseldorf 1977; T. K. Glasgow, G. J. Santoro, "Oxidation and hot corrosion of coated and bare oxide dispersion strengthened superalloy MA-755 E", Oxid. Met. 15, page 251, 1981). The route whereby resistance to high-temperature corrosion may be improved by using fine-grained materials has not, in the meantime, been followed, since this would lead to a disproportionately large loss of strength at high temperatures.

There is accordingly the need to have available a material which is suitable for the highly stressed components of thermal turbomachinery, and which combines high strengths at elevated temperatures with enhanced resistance to oxidation.

The object underlying the invention is to describe a component which is composed of a dispersion-hardened superalloy, together with a process for its manufacture, offering the greatest possible exploitation of the high creep-rupture strength of the superalloy and at the same time as high a resistance to high-temperature corrosion as may be possible.

This object is achieved by using a component, having high resistance to corrosion and oxidation, composed of a dispersion-hardened superalloy, produced by subjecting a fine-grained workpiece to heat and/or thermomechanical treatment to yield a coarse-grained core structure, as a result of recrystallization and a skin zone, restrained from recrystallization and retained in the fine-grained condition.

Figure 2:
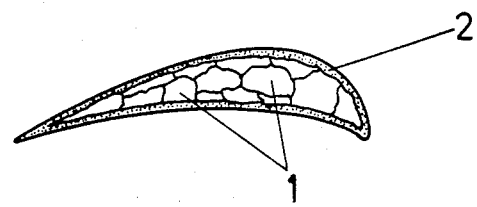

The invention is described by reference to the illustrative embodiments which follow, and which are explained in more detail by means of the Figures, in which:

FIG. 1 shows a longitudinal section through a blade of a thermal turbomachine, and FIG. 2 shows a transverse section through a blade of a thermal turbomachine.

FIG. 1 represents the longitudinal section of a component having the form of a blade of a thermal turbomachine. The example is referred, in particular, to a gas-turbine blade. The core is marked 1, and is coarse-grained, being composed, in this case, essentially of longitudinally oriented columnar crystals. The core 1 is enveloped, on all sides, by a case, this case representing the fine-grained skin zone 2 of the workpiece. Depending on size, composition, and the intended application, the average crystallite size in the core 1 can amount to 0.2 to 50 mm in the longitudinal direction, and 0.1 to 10 mm in the transverse direction. In contrast, the size of the crystallites forming the fine-grained skin zone can assume average values ranging from 0.1 to 5μ.

FIG. 2 shows a corresponding transverse section through the component depicted in FIG. 1. The transverse section refers to the aerofoil portion of the blade. All reference numbers correspond to those in FIG. 1.

ILLUSTRATIVE EMBODIMENT I

See FIGS. 1 and 2.

In the first step of the process, a preform, corresponding closely to the end product, was manufactured from a forging blank composed of a dispersion-hardened nickel-based superalloy carrying the proprietary designation MA 6000 (an Inconel product), which had been prepared by a powder-metallurgical route. The alloy possessed the folowing composition:

| | |
|---|---|
| Ni = | 69% by weight |
| Cr = | 15% by weight |
| W = | 4.0% by weight |
| Mo = | 2.0% by weight |
| Al = | 4.5% by weight |
| Ti = | 2.5% by weight |
| Ta = | 2.0% by weight |
| C = | 0.05% by weight |
| B = | 0.01% by weight |
| Zr = | 0.15% by weight |
| $Y_2O_3$ = | 1.1% by weight |

The preform represented a turbine blade, 120 mm long and 70 mm wide, with a maximum thickness of 15 mm. The workpiece was heated in a manner such that its core 1 was brought to 900° C., while its skin zone 2, near the surface, was brought to 1100° C. The workpiece was then inserted into a forging die, composed of a molybdenum alloy (TZM) and preheated to 1050° C., and was subjected to a foregoing operation such that the reduction at the thickest point of the aerofoil portion of the blade amounted to 10%.

After the hot-working operation, the workpiece was cooled and was afterwards annealed for one hour at 1280° C., the purpose of this treatment, performed in an air-circulation furnace, being to bring about recrystallization of the core. The workpiece was afterwards deburred. Examination showed that the core 1 contained columnar crystals which were, on the average, 200μ wide, 50μ thick, and 400μ long. The fine-grained skin zone 2, which had not recrystallized, exhibited an average depth of 1 mm, and was formed by crystallites possessing an average diameter of 0.4μ.

ILLUSTRATIVE EMBODIMENT II

A forging blank, possessing the same composition and dimensions as given under Example I, was subjected to the same process steps, up to, but not including, the grain-coarsening annealing treatment. In contrast to Example I, this last step took the form of a zone-annealing treatment, carried out at 1280° C., with the temperature front advancing in the longitudinal direction of the workpiece. The speed of advance was 1 mm/min., and the temperature gradient was 10°/mm. The columnar crystals forming the core exhibited an average width of 2 mm, a thickness of 0.2 mm, and a length of 8 mm.

ILLUSTRATIVE EMBODIMENT III

In a first step, a preform, possessing similar dimensions, was forged from a forging blank possessing the same composition as in Example I, and a turbine blade was then forged to the finished dimensions, this operation being performed under isothermal conditions. The workpiece was thereupon exposed to the radiation from a quartz lamp. As a result of thermal conduction, a portion of the heat flowed towards the interior of the workpiece. Maintaining a heating rate of 200° C./min., the surface was brought to a final temperature of 1140° C., at which temperature it was held for four minutes. Following this treatment, the workpiece was cooled, and then annealed for one hour at 1280° C. After cooling, a non-recrystallized, fine-grained skin zone 2, 1.2 mm thick, could be identified, together with a recrystallized, coarse-grained core 1. See FIGS. 1 and 2.

ILLUSTRATIVE EMBODIMENT IV

A rotor blade for a rotating thermal machine was manufactured, by pressing, from a dispersion-hardened nickel-based superalloy. The alloy possessed the following composition:

| | | |
|---|---|---|
| C = | 0.11% | by weight |
| Co = | 8.5% | by weight |
| Cr = | 16% | by weight |
| Mo = | 1.75% | by weight |
| W = | 2.60% | by weight |
| Tr = | 1.75% | by weight |
| Nb = | 0.9% | by weight |
| Al = | 3.4% | by weight |
| Ti = | 3.4% | by weight |
| B = | 0.01% | by weight |
| Zr = | 0.05% | by weight |
| Ni = | balance | |

The blade, which was 70 mm long, 35 mm wide, and 8 mm thick, was inductively heated by means of a medium-frequency heating unit. The frequency was 1 kHz. In order to hold the skin zone of the workpiece at a lower temperature than the core, the surface of the workpiece was, at the same time, vigourously cooled by means of a blower. The process was managed in a manner such that a temperature of 1230° to 1280° C. prevailed in the core, while the skin zone was held at 1140° C. During this treatment, the skin zone remained fine-grained, while the core recrystallized, and became coarse-grained. The former exhibited an average thickness of 0.3 mm.

The invention is not restricted to the illustrative embodiments. The process which has been described permits the manufacture of components which exhibit, in the core 1, an average crystallite size of 0.2 to 50 mm in the longitudinal axis, and 0.1 to 10 mm in the transverse axis, while also exhibiting crystallites with diameters ranging from 0.1 to 5μ in the fine-grained skin zone 2, this skin zone 2 forming a case. This latter zone can exhibit a thickness (depth) of 20 to 2000μ. The process is particularly suitable for the manufacture of blades for thermal turbomachines. The process invariably starts with the workpiece in a fine-grained initial condition, as is desired, in any case, for the preceding shaping operations. The subsequent heat treatment, and/or thermomechanical treatment, is intended to ensure that the core 1 experiences a microstructural change, in the form of grain-coarsening, while the skin zone 2 (case) is restricted from participating in the recrystallization and remains fine-grained.

This treatment can comprise heating the skin zone 1 of the workpiece to slightly below the recrystallization temperature, while its core 1 must remain at a temperature which is 150° to 350° C. lower. The process can now be continued, by forging, in a die which has been preheated to a temperature not more than 350° C. below the recrystallization temperature, it being desirable that the reduction at the thickest point of the workpiece profile be 10 to 30%. Thereafter, the workpiece is subjected to an annealing treatment at a temperature above the recrystallization temperature. If this annealing treatment is carried out as a zone-annealing operation, it is advantageous if the speed of advance is 1 mm/min.. and the temperature gradient is 10° C./mm. The workpiece can also be forged, to the finished dimensions, at a temperature below the recrystallization temperature, and be heated, thereafter, to a temperature value slightly below the recrystallization temperature, at a rate of 50° to 250° C./min., this being accomplished by means of radiation from a quartz lamp, accompanied by thermal conduction towards the interior, and be held in this condition for a period not exceeding 30 minutes. The forging operation can advantageously be carried out under isothermal conditions. According to a further variant of the process, the workpiece can be inductively heated and simultaneously cooled by radiation and/or convection at the surface, in a manner such that the core 1 is brought to a temperature above the recrystallization temperature, while the skin zone 2 remains below this temperature, by virtue of the surface cooling. The operating parameters can be matched to the shape and size of the workpiece, in order to obtain the desired temperature gradients, which must be directed so that the temperatures fall towards the surface, this matching being achieved by selecting the frequency, which determines the penetration depths of the magnetic field, and by adjusting the intensity of the cooling. It is self-evident that the recrystallization-annealing treatment, which is necessary, in all variants of the process, to bring about grain coarsening in the core 1, can be carried out as a zone-annealing treatment.

I claim:

1. Component possessing high resistance to corrosion and oxidation, composed of a dispersion-hardened superalloy, characterized in that its structure comprises a coarse-grained core (1), in which the average crystallite size ranges from 0.2 to 50 mm in the longitudinal axis, and from 0.1 to 10 mm in the transverse axis, and a fine-grained skin zone (2) which is 20 to 2000μ thick, has an average crystallite size ranging from 0.1 to 5μ, and forms a case.

2. Component according to claim 1, characterized in that it is a blade of a thermal turbomachine.

3. A process for the manufacture of a component possessing high resistance to corrosion and oxidation, composed of a dispersion-hardened superalloy, comprising subjecting a workpiece in a fine-grained condition to a heat treatment and developing a coarse grained condition in the core while retaining the fine grained condition of the skin zone of said workpiece.

4. The process of claim 3 wherein said heat treatment comprises heating said skin zone slightly below its recrystallization temperature while heating said core at a temperature 150° to 350° C. lower.

5. The process of claim 3 further comprising forging said workpiece in a die preheated to a temperature no greater than 350° C. below the recrystallization temperature of said workpiece and further subjecting said workpiece to an annealing treatment above the recrystallization temperature of said workpiece.

6. The process of claim 3 wherein said heat treatment comprises effectuating a 10% reduction in cross-section at the thickest point of the workpiece by heating said skin and core zones of said workpiece to forging temperatures of 1100° and 900° C., respectively.

7. The process of claim 6 further comprising forging said workpiece in a die preheated to a temperature less than 350° C. below the recrystallization temperature of said workpiece and further subjecting said workpiece to an annealing treatment above the recrystallization temperature of said workpiece.

8. The process of claim 7 wherein said workpiece is forged in a die preheated to 1050° C.

9. The process of claim 8, wherein said annealing treatment comprises zone-annealing said workpiece at 1280° C., wherein the temperature front advances 1 mm/min in the longitudinal direction, and further wherein the temperature gradient is 10° C./mm.

10. The process of claim 3 wherein said heat treatment comprises
  (a) forging said workpiece below its recrystallization temperature; and
  (b) heating said skin zone of said workpiece to a temperature slightly below its recrystallization temperature at a heating rate of 50° C./min. to 250° C./min.

11. The process of claim 10 wherein said said skin zone is heated for less than 30 minutes by a radiant energy means coupled with a thermal conduction means.

12. The process of claim 11 wherein said workpiece is further subjected to an annealing treatment at a temperature above its recrystallization temperature.

13. The process of claim 12, wherein said workpiece is forged under isothermal conditions and further wherein said skin zone is heated, at a heating rate of 200° C./min., to a temperature of 1140° C., heating said skin zone at 1140° C. for 4 minutes, and then annealing said workpiece for 1 hour at 1280° C.

14. The process of claim 3 wherein said heat treatment comprises induction heating said workpiece while simultaneously cooling said skin zone such that said core is heated at a temperature above the recrystallization temperature while said skin zone is heated slightly below its recrystallization temperature.

15. The process of claim 14, wherein said core is heated between 1230° to 1280° C., and said skin zone is heated at 1140° C.

* * * * *